Sept. 5, 1967

V. D. MOLITOR 3,340,380

FOOD SERVICE EQUIPMENT

Original Filed May 8, 1961

INVENTOR.
VICTOR D. MOLITOR
BY
Horace B. Van Valkenburgh
ATTORNEY

Sept. 5, 1967  V. D. MOLITOR  3,340,380
FOOD SERVICE EQUIPMENT
Original Filed May 8, 1961  5 Sheets-Sheet 2

INVENTOR.
VICTOR D. MOLITOR
BY
Horace B. Van Valkenburgh
ATTORNEY

Sept. 5, 1967 V. D. MOLITOR 3,340,380
FOOD SERVICE EQUIPMENT
Original Filed May 8, 1961 5 Sheets-Sheet 3

INVENTOR.
VICTOR D. MOLITOR
BY
Horace B. VanValkenburgh
ATTORNEY

Sept. 5, 1967 V. D. MOLITOR 3,340,380
FOOD SERVICE EQUIPMENT
Original Filed May 8, 1961 5 Sheets-Sheet 4

INVENTOR.
VICTOR D. MOLITOR
BY
Howell B. Van Valkenburgh
ATTORNEY

Sept. 5, 1967 V. D. MOLITOR 3,340,380
FOOD SERVICE EQUIPMENT
Original Filed May 8, 1961 5 Sheets-Sheet 5
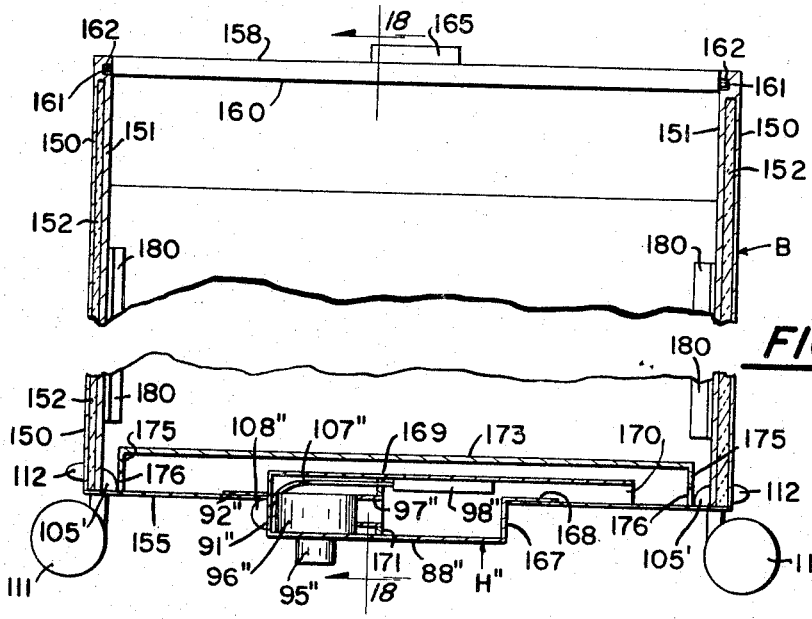
FIG. 17.
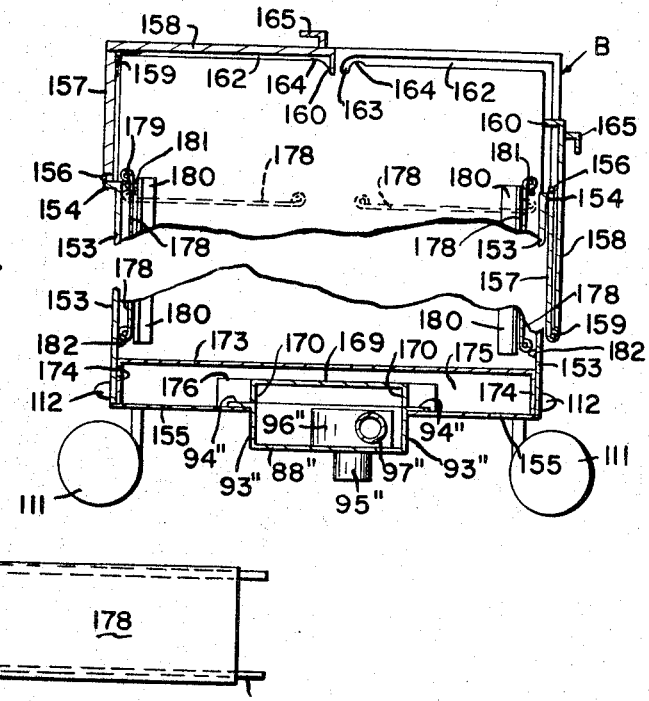
FIG. 18.
FIG. 19.
INVENTOR.
VICTOR D. MOLITOR
BY
Horace B. Van Valkenburgh
ATTORNEY

United States Patent Office 3,340,380
Patented Sept. 5, 1967

3,340,380
FOOD SERVICE EQUIPMENT
Victor D. Molitor, 2829 S. Santa Fe Drive,
Englewood, Colo. 80110
Original application May 8, 1961, Ser. No. 108,622.
Divided and this application Feb. 7, 1966, Ser. No. 533,114
6 Claims. (Cl. 219—386)

This application is a division of my copending application Ser. No. 108,622, filed May 8, 1961 (now abandoned). This invention relates to an assembly station and service carts for use in a food service system for serving large groups of people, such as at a banquet.

Previous to the present invention, it was necessary to prepare food hours in advance, storing the hot foods on or in a steam table and the cold foods in a refrigerator. Often, it was necessary to place the food on plates long before it was to be served, and then immediately before serving freshen the plates with a garnish, but foods prepared and stored in this manner exchange tastes with each other, lose color, and lose their own taste. Thus, the industry has found that this system is not entirely satisfactory, since food handling cost is increased, labor cost is increased, and the patrons generally are not satisfied with the quality of the meal. Also, if a large group is to be served, considerable time is expended in serving the entire group, so that the food of the patrons first served becomes cold before the last patron can be served. The speed of service has been a serious problem as well as the time consumed in clearing the dishes after the meal and serving dessert, for instance. Also, it is often necessary to transport the food a considerable distance from the kitchen to the banquet area, particularly when the kitchen is located on a different floor than the banquet area. Thus, it has been observed that it is nearly impossible to serve a hot, tasty plate of food under such circumstances.

Among the objects of this invention are to provide a novel assembly station for a food service system, as for banquets and the like; to provide novel service carts; to provide such a station and carts for a system in which mass production methods may be employed; to provide such a station and carts by which the food may be served in as fresh and tasty condition as though it had been served directly from the stove, by which each plate of food is of the same quality, by which the timing of service may be controlled, by which fast and efficient service is provided, by which a central kitchen may be more satisfactorily utilized, and by which a remote assembly area which may be of minimum size may be utilized; to provide such an assembly station at which hot food may be placed on plates quickly and with facility; to provide a novel hot storage cart in which filled plates may be placed at the assembly station, each filled plate being conveniently provided with a cover; to provide such an assembly station in which filled plates are prevented from falling onto the floor if they are not immediately picked up and placed in hot storage carts by the person assigned to this task; to provide such an assembly station which includes thermostatic control for the food; to provide such hot storage carts which are heated but are readily cleaned; to provide such a hot food storage cart in which a plurality of stacks of plates and covers are supported; to provide a hot food cart in which heated food may be placed for use in replenishing the supply of food at the assembly station; to provide such a hot food storage cart wherein each tray of food is maintained at the same temperature; to provide such a hot food cart wherein certain parts are readily removable for cleaning; to provide such a hot food storage cart in which the reception of trays of food is facilitated and lids are held tightly on the trays during transportation; and to provide such hot food storage carts having features which may be utilized in other types of carts.

Additional objects and the novel features of this invention will become apparent from the description which follows, taken in conjunction with the accompanying drawings, in which:

FIG. 17 is a longitudinal vertical section of a banquet assembly cart, shown in FIG. 1;

FIG. 18 is a condensed vertical section, taken along line 18—18 of FIG. 17 and showing particularly the construction of a lid for the cart and dividers installed therein; and FIG. 19 is a top plan view, on a slightly reduced scale, of a divider of FIG. 18.

Figure 1:
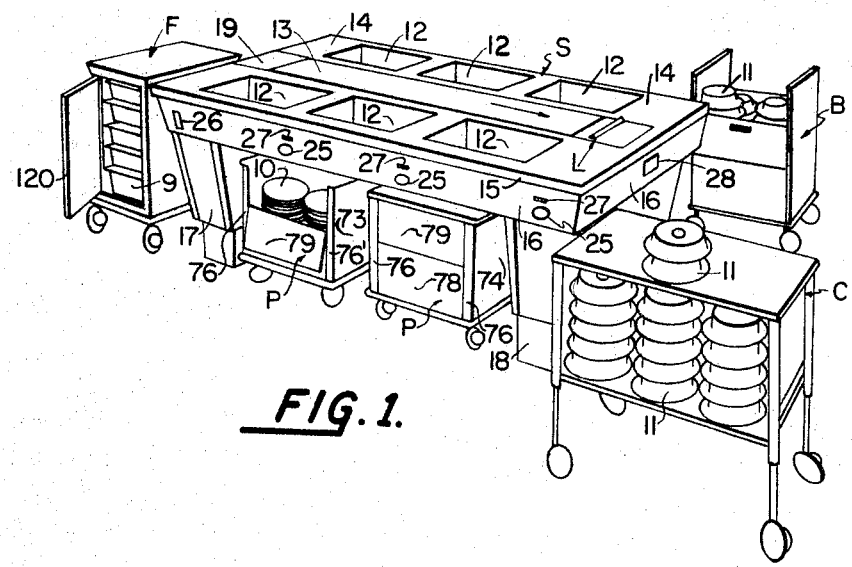
FIG. 1 is a perspective view of an assembly station, storage cart, and hot food cart, forming parts of a food service system.

The food assembly station S shown in FIG. 1 is conveniently located near the center of a suitable room, such as a banquet assembly pantry, adjacent the banquet service area when the kitchen is located some distance from the banquet service area. The food is transferred from the kitchen in deep trays 9, placed in a hot food cart F, which is positioned adjacent the food assembly station and the heating unit thereof conveniently plugged into an electrical outlet on the assembly station. The plates 10, as well as plate covers 11, if desired, are stored in plate service carts P, which may be rolled under the assembly station, as shown, and the heating units plugged into electrical outlets at the assembly station to keep the plates and plate covers warm. If a cold plate is to be served, the plates may be stored on and/or moved to the dining area by a bus cart C, the specific construction of which forms no part of the present invention.

Figure 2:
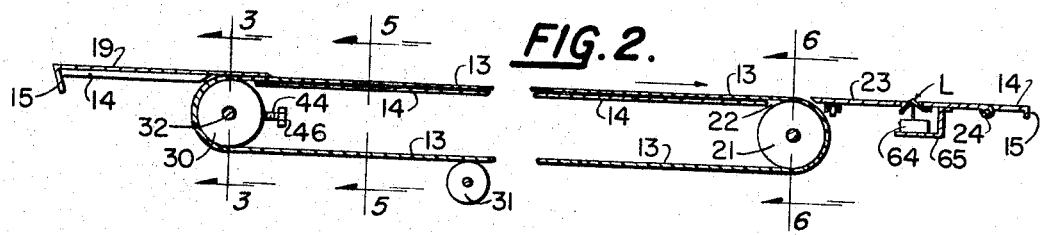
FIG. 2 is a condensed longitudinal section, on an enlarged scale, of an endless conveyor belt and pulley of the assembly station of FIG. 1.

At the assembly station S, the pans 9 containing the various foods are placed in heated wells 12, from which the food is placed on the plates as they travel along a belt 13, which moves in the direction of the arrows of FIGS. 1 and 2. The plates are preferably placed on the belt 13 at one end and removed from the opposite end, the belt travelling relatively slowly, such as at a speed of 15 feet per minute, and the belt also being sufficiently wide that two plates may be placed side by side on the belt, with the plates on one side being served from the wells 12 on that side of the plates on the opposite sides of the belt being served from the opposite wells. The person at the first well 12 on each side conveniently removes a stack of plates from plate cart P and places the stack at the end of the station. This same person places each plate, in turn, on the belt, after placing a serving of food from the first well thereon. The food at the first well is conveniently meat or other solid food, which does not require dipping, ladling, etc., to permit this person additional time for handling the plates. While three wells 12 are shown on each side of the assembly station S, in the event that more than three different foods are to be placed on each plate, two receptacles, each with a different food therein, may be substituted at one or more well positions. As will be evident, with one person standing at each well 12 and placing the same food on each plate, the operation may be carried out at maximum speed. Thus, 48 plates per minute, or 720 plates in a fifteen minute period, have been filled at such an assembly station. As the filled plates reach the end of belt travel, they are removed, conveniently by one or two persons who place garnish on the plate, then a cover 11 and places the same in a banquet service cart B, two of which may be provided when the assembly station is operating at maximum capacity. A limit switch assembly L is located at the end of the belt travel, to stop the conveyor should any plate not be removed by the worker stationed there, thereby preventing filled plates from being pushed off onto the floor.

One advantage of the system of this invention is that eight persons can fill the plates at the speed indicated, but only one of these need be skilled in food service, i.e. having a knowledge of portion control, quality, and the good appearance of the food on the plate. This person controls the others from his work position and may be either a person who places the plates on the belt, or a person who places the garnish and cover on the plates as they reach the end of the conveyor belt. As indicated, the conveyor belt speed is advantageously preset at 15 feet per minute, and the assembly rate can be controlled through the number of plates placed on the belt, by varying the spacing between the plates. In comparison with the 48 plates per minute which have been filled at an assembly station of this invention, previously only about eight plates per minute could be filled by passing the plates from one person to another in the kitchen. This previous procedure made it necessary to use high paid cooks and chefs for the task of dishing plates, resulting in additional expense. Also, it is difficult, if not impossible, to control the arrangement and appearance of the food on plates being passed from hand to hand.

When a banquet service cart B has been filled, it is closed and moved directly to the banquet area, the heating unit thereof being unplugged from the assembly station upon such movement. The heating unit may be replugged into an electrical outlet when the banquet area is reached, if the food is not to be served immediately, thus maintaining the food piping hot at all times. The banquet service carts B preferably have a reasonable capacity, such as 60 plates and covers, but without being unwieldy in size. Thus, a sufficient number of banquet carts B should be on hand, so that a filled cart can be immediately replaced with an empty cart, whose heating unit can be plugged into an electrical outlet at the assembly station A. Also, when the assembly station is being operated at capacity, a banquet service cart B will be substituted for the bus cart C shown in FIG. 1, so that two banquet service carts can be filled simultaneously. If a large group is to be served, the dishing of the plates may be begun some time before the starting time for the banquet and the filled plates stored in banquet service carts B, as described. If a smaller group is to be served, the filled plates with covers 11 can be stacked in the bus cart C, as shown, which when full can be immediately wheeled to the banquet area.

The deep trays 9, shown as stored in the hot food cart F and previously filled in the kitchen, are removed from cart F and placed in the wells 12 when the plate filling operation is begun. Of course, several hot food carts F will be in use, to permit empty trays 9 in wells 12 to be replaced by full trays and a cart F returned to the kitchen for more food. The waiter or waiter's helpers, from the banquet area, may be utilized to move banquet service carts B to and from the dining area, while additional employees may be necessary to move the hot food carts F to and from the kitchen area. As will be evident, the chef and cooks need not leave the kitchen area and need only fill pans 9 with hot food. The pans 9 fit into the wells 12 or, as indicated previously, two or more pans 9 may fit into one well 12, as when more than three food items are placed on one plate.

Figure 3:
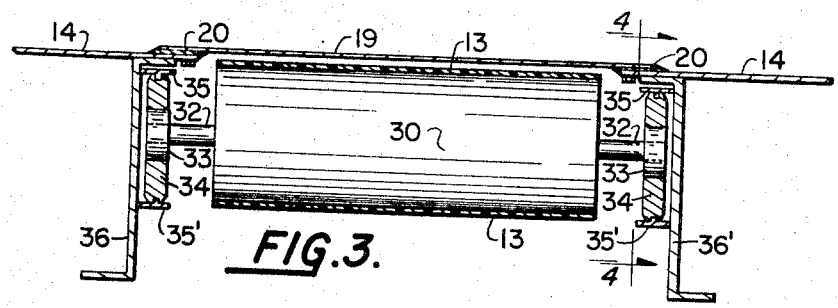
FIG. 3 is a vertical section, on a further enlarged scale and taken along line 3—3 of FIG. 2, showing particularly an adjustable pulley.
Figure 6:
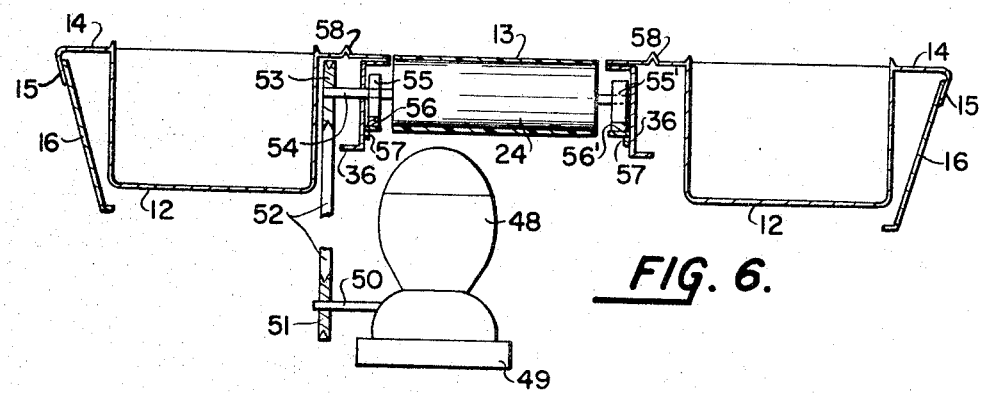
FIG. 6 is a vertical section, on an enlarged scale and taken along line 6—6 of FIG. 2, showing particularly a drive pulley and a motor for the conveyor belt.
Figure 7:
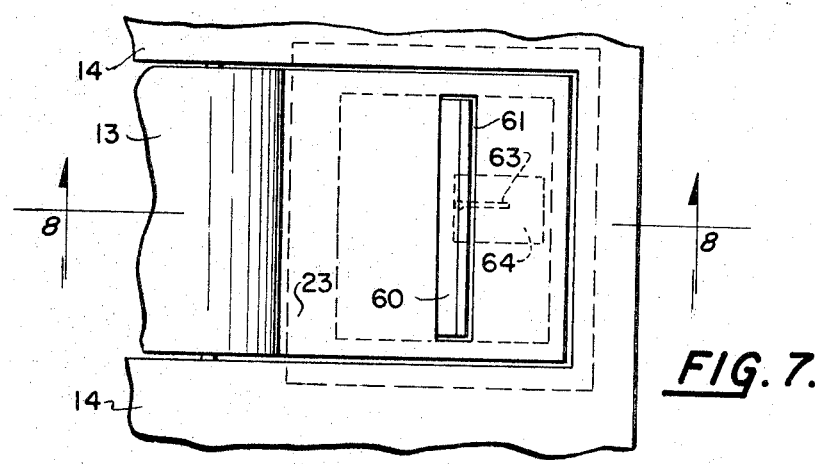
FIG. 7 is a partial top plan view of a terminal portion of the assembly station of FIG. 1, on an enlarged scale, and showing particularly a limit switch for the conveyor belt.

The top 14 of assembly station A is preferably made of heavy gage stainless steel, with all edges rolled down to form flanges 15, as in FIGS. 1, 2 and 6, and highlighted to a mirror finish. The flanges 15 lap over side skirts 16, which may be welded thereto, as in FIG. 6, while the top is supported, as in FIG. 1, by a pair of spaced pylons 17 and 18, which may be decorated with black formica or other suitable material and trimmed with stainless steel. The upper run of the endless conveyor belt 13 moves longitudinally along the center of the table top, being slotted at the entrance end and the slot covered by a plate 19 which is conveniently welded thereto and raised by spacing plates 20, as in FIG. 3, to form a slot sufficient in size to accommodate passage of the belt. The upper run of the belt moves downwardly around a drive roller 21 through a slot 22, formed at the discharge end of the top and in which a plate 23 fits, plate 23 being hinged to the top at a hinge pin 24 and on which is mounted the limit switch L, as in FIG. 2. The three wells 12 on either side of the belt may be integral with top 14, as shown in FIG. 6, while each well 12 is provided with a conventional heater (not shown) regulated by an adjustable thermostatic control 25, as in FIG. 1, mounted at a convenient position in skirt 16 to permit regulation of the temperature of the food contained in the pan or pans in each well. A master switch 26 is located at one end of assembly station A, to turn off all the well heating units after the plates have been dished, while a lamp 27 is conveniently positioned adjacent each heater control 25, for convenience in indicating which heating units are on. A double electrical outlet 28 is conveniently positioned in skirt 16 at each end of the assembly station for convenience in plugging in the heaters of two banquet service carts B or two plate carts P.

Figure 4:
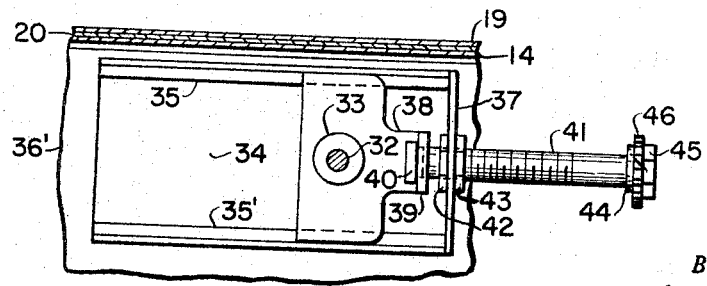
FIG. 4 is a fragmentary vertical section, on a further enlarged scale and taken along line 4—4 of FIG. 3, of the pulley adjustment means.
Figure 5:
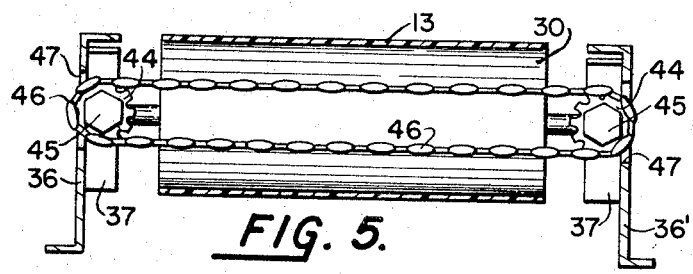
FIG. 5 is an enlarged, vertical section, taken along line 5—5 of FIG. 2, showing other parts of the pulley adjustment means.

Belt 13 is tensioned between drive roller 21 and an adjustment roller 30, as in FIG. 2, with the bottom run of the belt passing over an idler roller 31, which prevents the lower run of the belt from sagging. Adjustment roller 30 is mounted on a shaft 32, as in FIG. 3, each end of which is rotatably mounted in a self-aligning bearing 33, in turn mounted in a slide block 34. Each slide block 34 is slidably mounted between a pair of spaced, upper and lower, parallel guides 35 and 35' for adjusting the position of roller 30, in a manner to be described. Each guide 35 and 35' is provided with a longitudinal projection which faces the opposite guide and is engaged by a groove in the corresponding edge of the slide block 33, as in FIGS. 3 and 4. Each pair of guides is mounted on and extends inwardly from the web of a Z-shaped beam 36 or 36', respectively, whose upper flange is welded to the bottom of top 14, as in FIG. 3, while the ends of each pair of guides are connected at the front by a vertical mounting plate 37, as in FIG. 4. Each slide block 34 has a forwardly projecting neck 38 terminating in an inturned flange 39, the neck 38 having a slot therein for receiving the head 40 of an adjustment screw 41 and the flange 39 having a hole therein for the adjustment screw. Conveniently, head 40 is attached to the end of screw 41 after insertion of head 40 in the slot and insertion of screw 41 through the hole, so that head 40 will bear against the respective edge of the slot to move slide 34 forwardly or rearwardly as the screw is advanced or retracted. Screw 41 also extends through and is threadably received in a nut 42, welded on the back of plate 37 and is held in adjusted position by a lock nut 43. A sprocket 44 is mounted adjacent the hexagon head 45 of the screw for receiving an endless chain 46. As in FIG. 5, the endless chain 46 extends between the sprockets 44 of each adjustment screw, so that the two adjustment screws will turn in unison. With this arrangement, one may turn one screw, as with a wrench, and the other adjustment screw will also turn an equal amount, to assure that both ends of the shaft are adjusted to the same position and the tension at both sides of belt 13 will be equal, to prevent the belt from running off to one side. Before an adjustment is made, the lock nuts 43 are loosened, then one screw 41 is adjusted, as through an access slot 47 in the corresponding Z-beam 36 or 36', while after adjustment has been made, the lock nuts 43 are tightened. It is preferable that the initial adjustment of screws 41 be made at the factory, before chain 46 is mounted on sprockets 44. Once the chain is in place on the sprockets, movement of one adjustment screw will move the other adjustment screw an equal amount, so that the tension on both sides of the belt is always the same. Thus, an inexperienced person can adjust the tension of the belt, without altering the equal tension at both sides.

The belt is driven by a motor 48, as in FIG. 6, which is provided with a suitable speed reduction unit, and is mounted on a base 49, which in turn may be mounted on any suitable part of the assembly station, such as on pylon 17. The motor drive shaft 50 has a pulley 51 mounted on the outer end thereof engaging a V-belt 52, which also engages a pulley 53 mounted on the end of a shaft 54 on which drive roller 21 is mounted. The adjacent end of the shaft 54 extends through a bearing 55 which is mounted on a pillow block 56 and the other end extends into a bearing 55' mounted on a pillow block 56'. Each pillow block 56 and 56' is conveniently mounted on an angle 57, secured to Z-beam 36 or 36', respectively. Top 14 may also be provided with an upwardly extending, V-shaped rib 58 spaced from each edge of belt 13, to assist in maintaining the plates on the belt. Generally, it is most satisfactory to run the conveyor belt at a speed of 15 feet per minute. However, if it should be found that for some operations another speed is more desirable, the speed may be varied by changing the size of either pulley 51 or 53, although the drive shaft pulley 51 is more readily accessible and therefore would normally be the one to be changed. Of course, the speed reduction unit of motor 48 may be adjustable, if desired.

Figures 8, 9:
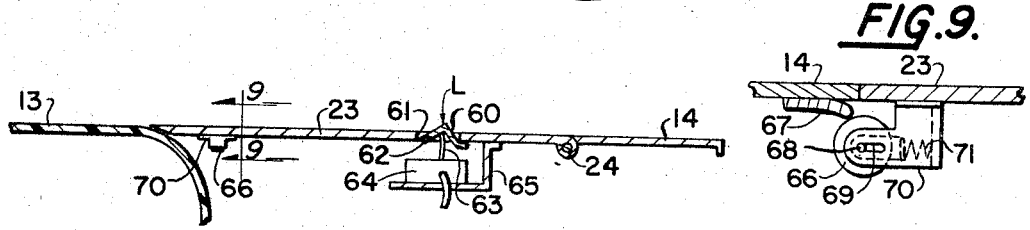
FIG. 8 is a fragmentary vertical section taken along line 8—8 of FIG. 7.
FIG. 9 is an enlarged fragmentary section, taken along line 9—9 of FIG. 8 and showing particularly a safety catch.

If plates 10 are not picked up immediately upon reaching the end of belt 13, by the employee stationed there, they will slide across hinged plate 23 of FIGS. 2 and 8 to engage the limit switch L, which includes an angular striker 60 extending upwardly through a transverse slot 61 in plate 23 and pivoted on a transverse pin 62. As shown, striker 60 has a front lip which engages the underside of the front edge of slot 61 to limit upward movement of the striker. When a plate engages striker 60, the striker will be depressed and will pivot about hinge 62 to depress an arm 63 of a microswitch 64 which is conveniently mounted on a bracket 65 fastened, as by welding, to the bottom of plate 23. The microswitch is connected in series with the control circuit for motor 48, so that the motor will be stopped, stopping conveyor belt 13 so that the plates will not be pushed off the station and fall onto the floor. When a plate depressing striker 60 is picked up, arm 63 will move upwardly under the influence of a spring within the microswitch, pushing striker 60 up through slot 61 and the motor will again be started.

Should a fork or the like fall upon conveyor belt 13, if the tines were down, they would run into the slot between plate 23 and belt 13, as in FIG. 8, causing the belt to be ripped and torn as it continued moving. The same damage could be caused by a knife or other implement if it were similarly caught. To prevent such an occurrence, plate 23 is not only hinged at pin 24, but also connected to top 14 by a catch so that the force of a fork or knife jamming into the slot will raise the end of plate 23, allowing the fork or knife to fall into a crumb tray (not shown) positioned at the end of the belt. The plate is normally held in down position by a catch at either side, such as including a spring urged detent roller 66 of FIGS. 8 and 9, which normally engages the lower corner of a flange 67 depending from top 14. As in FIG. 9, detent roller 66 is conveniently mounted on a transverse pin 68 disposed in slots 69 of a U-shaped bracket 70 and urged outwardly by spring 71. Advantageously, bracket 70 is attached to the bottom of plate 23. The detent rollers 66 are advantageously adjusted so that a very small amount of force is necessary to raise plate 23, so that the plate will raise before belt 13 can be damaged.

The plate service carts P, shown in greater detail in FIGS. 10–13, are utilized for storing plates 10 and particularly for preheating the plates and maintaining them warm, as indicated previously. Such carts are desirably made of heavy gage stainless steel, each having side walls 73 connected by a rear wall 74 and a bottom 75 having a central opening for receiving a heater unit H, to be described. The side walls 73 terminate in inturned flanges 76 and 76', shown in FIGS. 1 and 11, which provide a portion of the front wall. The remainder of the front wall consists of a fixed lower panel 78 and a movable upper panel 79 pivoted to the upper edge of the lower panel 78, as by a hinge 80, and provided with an upper curved lip 81. The peripheral edges of the side and rear walls each have an out-turned flange 82, at the top thereof, similar to lip 81 of upper panel 79. A removable top is provided for the cart and includes a front panel 83 and rear panel 84 which are pivoted together at the center by a hinge 85. Each panel 83 and 84 has a curved lip 86 around three sides which engage flange 82 of the side and rear walls to hold the top in position, particularly when closed, while lip 86 of front panel 83 also engages lip 81 of the upper front panel 79, when the latter is in raised position, to hold the front panel up so that the cart will be completely closed to assist in keeping the plates or covers, which are stored therein, warm. As in FIG. 10, the top front panel 83 may be raised and pivoted rearwardly onto the top rear panel 84, being shown as only partly back to full open position in FIG. 10 for clarity of illustration, thus releasing the upper edge of movable front panel 79, which may be pivoted downwardly to the position of FIG. 10, as shown also for one cart P in FIG. 1, to provide access to the plates or covers stored therein. When placing plates or covers in a cart P, top panel 83 may be pivoted over onto panel 84 to provide access to one half of the cart, then the top panels reversed to provide access to the other half. Or, the top may be removed entirely and then replaced after the plates have been placed therein. After the cart is full, the movable front panel 79 is lifted up and lip 86 of top panel 87 placed thereon to maintain front panel 79 in place, as in the case of the other cart P of FIG. 1.

Figure 10:
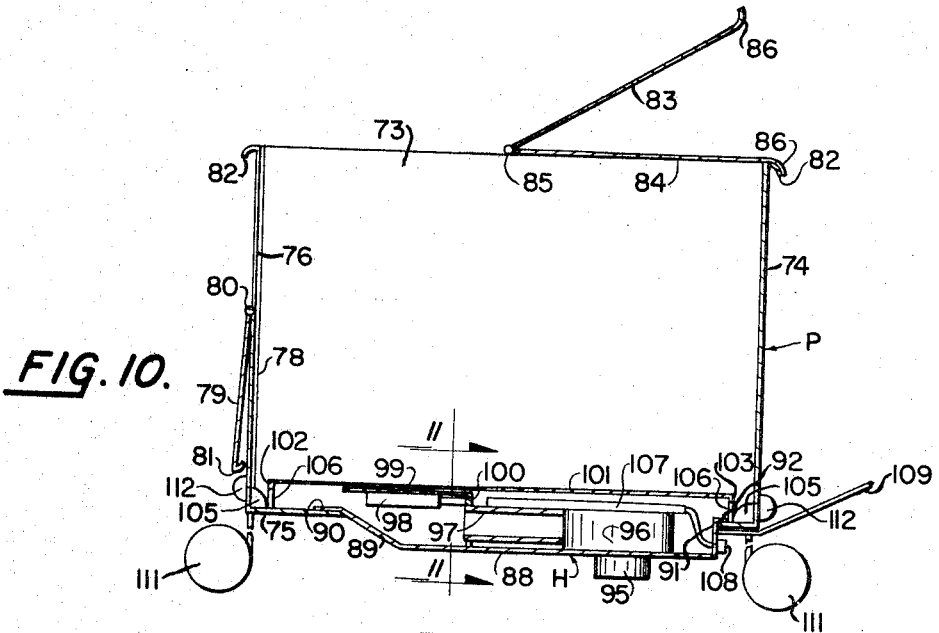
FIG. 10 is a central, longitudinal vertical section of a hot storage cart, shown also in FIG. 1.
Figure 11:
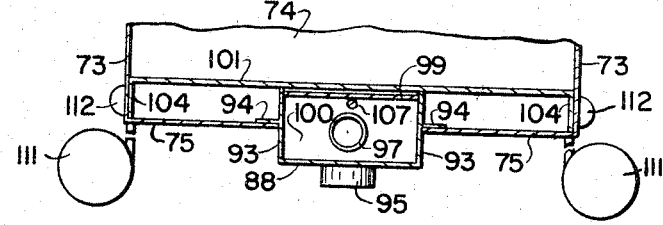
FIG. 11 is a fragmentary vertical section taken along line 11—11 of FIG. 10 and showing particularly a blower duct for the heater.
Figure 12:
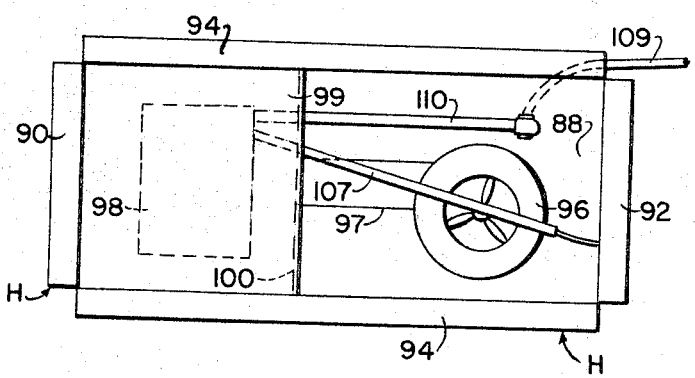
FIG. 12 is a slightly enlarged, top plan view of the heating unit for the storage cart of FIG. 10.
Figure 13:
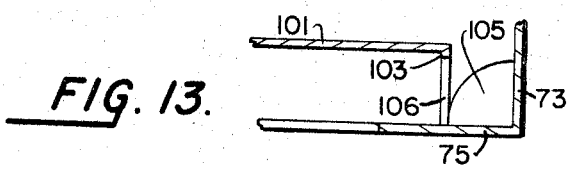
FIG. 13 is an enlarged, fragmentary vertical section corresponding to a lower corner of FIG. 10 and showing particularly the manner in which spacing ears engage a false bottom of the cart.

A thermostatically controlled heater unit H is supported by bottom 75 of the cart and extends downwardly through a central opening therein, as in FIGS. 10 and 11. The heating unit includes a bottom 88 terminating at its forward end in an upwardly and forwardly extending portion 89, having a forwardly extending flange 90 resting on bottom 75, and at its rear end in an upturned rear wall 91 having a rearwardly extending flange 92, also resting on bottom 75. The heater unit also has side walls 93 having laterally extending flanges 94 at their upper edges, which also rest on bottom 75 of the cart. The rear wall 91 and side walls 93 engage the edge of the opening in bottom 75 of the cart to hold heating unit H in position. As also evident from FIG. 12, the portion 89, rear wall 91 and side walls 93 are conveniently integral with bottom 88, being connected together at the corners, as by welding or lapped and riveted joints, while flanges 90, 92 and 94 are also conveniently integral with the remainder of the housing. A motor 95 is mounted on the underside of housing bottom 88, as shown, for driving a blower 96 mounted thereabove. Air is pulled into the blower from an inlet at the center of the top thereof and the blower outlet is connected to a duct 97 which extends forwardly toward an electrical heating unit 98 mounted on the underside of a plate 99 having a rear flange 100, the plate and flange being connected between side walls 93 of the heater housing and duct 97 being attached to flange 100 at an appropriate hole therein. A false bottom 101 fits down over the heater unit and has depending end flanges 102 and 103, respectively, and depending side flanges 104, the end and side flanges resting on bottom 75 of the cart to maintain the false bottom in spaced position above the heater unit H. To provide spaces between the end walls of the cart and the ends of the false bottom, end flanges 102 and 103 engage ears 105 which are mounted in the front and rear corners of the cart, as shown in FIGS. 10 and 13, while side flanges 104 merely abut side walls 73 of the cart, as in FIG. 11. Both front and rear flanges 102 and 103 have slots 106 therein, the slot in the rear flange 103 forming an intake opening for air to pass to blower 96 and the slot in front flange 102 forming a discharge opening through which heated air is discharged by the blower. This air passes up through the plates and/or covers stored in the cart and returns to the blower, so that generally the same air is recirculated and the amount of electricity needed for maintaining the air at a desired temperature is reduced. Also, the temperature throughout the cart will tend to be substantially uniform. A thermostat 107 extends across the intake of blower 96, as in FIGS. 10 and 12, and is adjusted to maintain the temperature of the articles within the cart by a control 108, mounted on rear wall 91, as in FIG. 10. Heater 98 is connected to a source of electricity through a cord 109, connected to the heater by wires installed in a conduit 110, as in FIG. 12. Advantageously, the cart is provided with rubber tired casters 111 at the four corners, so that it may easily be moved from place to place. A rubber or plastic bumper 112 advantageously extends around the lower periphery of the cart to prevent damage, should the cart be pushed against another article.

As can be seen, the plate storage cart P may be used to store plates and covers which are loaded in the kitchen or dishwashing area and the cart then wheeled to the assembly station and the heater and blower plugged into a socket to keep the plates and/or covers warm until they are ready to be used. Immediately prior to use, the plates and covers may be removed from the storage cart and the food placed thereon.

Figure 14:
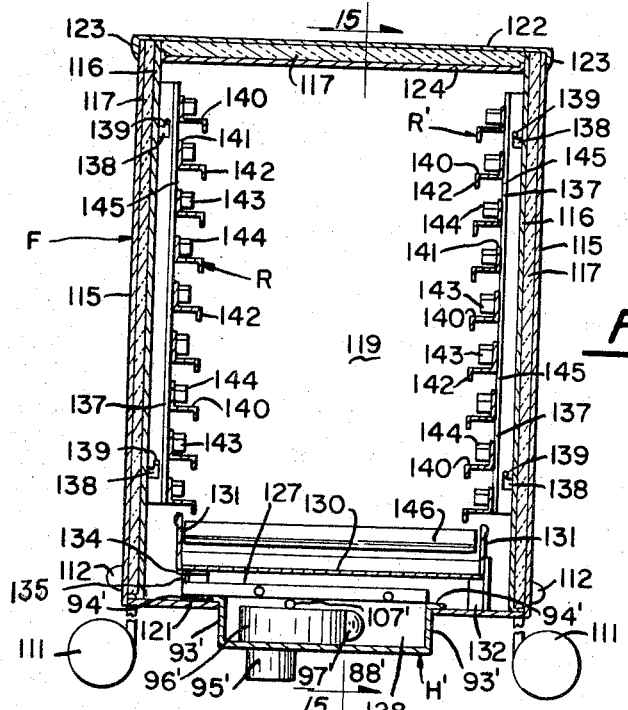
FIG. 14 is a central, lateral vertical section of a hot food cart shown in FIG. 1, illustrating particularly pan guides and a heater thereof.
Figure 15:
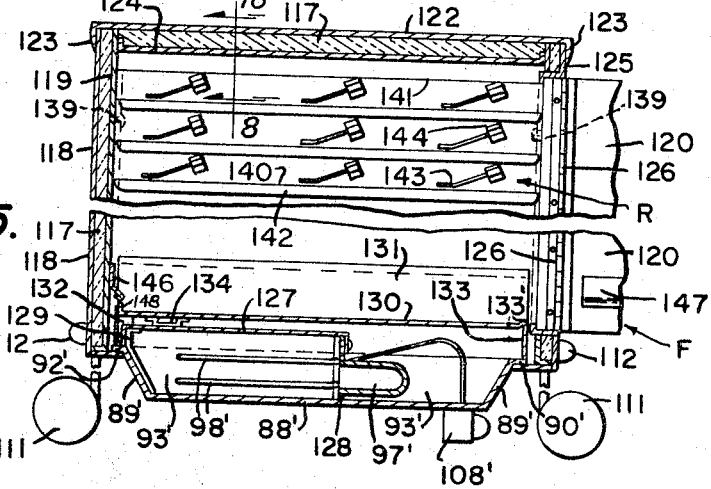
FIG. 15 is a condensed vertical section, taken along line 15—15 of FIG. 14 and showing particularly the pan clips for holding lids on food pans and additional details of the heater.
Figure 16:
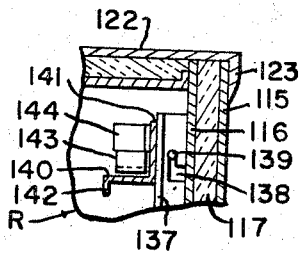
FIG. 16 is an enlarged, fragmentary vertical section, taken along line 16—16 of FIG. 15 and showing particularly a locking pin which holds a side panel in place in the cart of FIG. 14.

Details of the construction of the hot food cart F are shown in FIGS. 14–16. The hot food cart F is conveniently provided with spaced outer and inner side walls 115 and 116, with insulation 117 therebetween, as in FIG. 14, and spaced outer and inner rear walls 118 and 119, respectively, as in FIG. 15, again having insulation 117 therebetween. The cart also has an insulated front door 120, shown in FIG. 1, which is hinged at one side, as well as a bottom 121 and a top 122 with a downturned peripheral flange 123 engaging the outer walls. Insulation 117 is provided under top 122 and is held in place by a panel 124 having upturned peripheral flanges welded to the side and rear walls, and also to the top of a door frame 125, which forms the remainder of the front of the cart, along with the sides curving around to the front. The door 120 is provided with spaced outer and inner walls with insulation therebetween and is mounted on a hinge 126, as in FIG. 15. The inner and outer rear and side walls, door walls, bottom, top and top panel are conveniently made of stainless steel, so that the cart may be easily cleaned to meet sanitary requirements. Cart F is also provided with upper rubber tired casters 111 at each of the four lower corners and a bumper 112 of resilient material.

A heater unit H′, similar in certain respects to heater unit H of plate storage cart P, is received in an opening in bottom 121. Thus, heater unit H′ includes a housing fitting into a rectangular slot in bottom 121 and having a bottom 88′, upwardly sloping front and rear portions 89′ and side walls 93′ which, together with flanges 90′, 92′ and 94′, are similar to the corresponding parts of the heater unit H of cart P. Similarly, motor 95′, a blower 96′ and duct correspond to parts of heating unit H. As before, a thermostat 107′ overlies the intake of blower 96′ and is provided with a control 108′. The heater may consist of several rod-like heating units 98′ extending into a heating space formed by the rear portion of bottom 88′, and side walls 93′, rear sloping wall 89′, and a top plate 127 from the front edge of which a central wall 128 depends and from the rear edge of which a rear wall 129 depends. Heating units 98′ are conveniently mounted on central wall 128, to which duct 97′ extends, as in FIG. 15. At one side, the heating space is open, between cart bottom 121 and plate 127, to form an opening for discharge of heated air, but is closed at the opposite side by the upward extension of side wall 93′ to plate 127, as in FIG. 15. Forwardly of plate 127, the heater unit housing is open at the top, to permit air to be drawn into the inlet of blower 96′. A false bottom 130 extends over the heater unit, being formed with upturned side flanges 131 and supported by angular corner posts 132 spot welded to the side flanges at the corners, on the intake side, a front flange 133, having an inverted angular configuration 133′ at the upper edge, as in FIG. 15, and a support 134 resting on heater unit plate 127. A depending side flange 135 is provided with a slot corresponding to the shape of plate 127 and walls 128 and 129, thereby fitting over the plate and closing the outlet side of the heating unit, except for the discharge opening beneath plate 127. Thus, the heated air is blown upwardly at one side and behind a side rack R, to be described, then between the trays of food, then behind the opposite side rack R′ for return to the heating unit.

Side racks R and R′ each include front and rear side angles 137, each provided in the side leg with vertically spaced bayonet slots 138 which engage pins 139 extending inwardly from the front and rear walls, as in FIGS. 14 and 16. Thus, each rack is placed with the lower ends of the bayonet slots 138 engaging pins 139, then moved toward the respective side wall until it contacts the side wall and then dropped downwardly until the pins engage the upper ends of the bayonet slots. The side flanges space the racks from the walls and permit air to circulate behind the side walls and the racks. In each rack, a plurality of vertically spaced pan supporting guides 140 having upstanding rear flanges 141, extend between the angles 137, the rear flanges 141 being spot welded to the front legs of the angles 137. Each pan guide 140 terminates at the front edge in a downturned flange 142, which centers the pans between the racks and also forces any food which might spill out of a pan to drip downwardly onto the edge of the next pan, rather than behind the side racks. Spilled food will thus be forced to the front or rear of the pans for collection in the false bottom 130, as described later. Leaf spring clips 143 are located above the respective guides 140 and are adapted to bear against the lids on the pans to minimize the tendency for food to splash or run over the sides and down onto a lower pan. It has been found satisfactory to use three of these clips, spaced longitudinally above each of guides 140. Each of the spring clips 143 is attached, as by spot welding, to one leg of an angle 144, the opposite leg of which is attached, as by spot welding, to the rear flange 141 of the respective pan guide. The racks R and R′ are similar in construction, but the spring clips 143 of each extend rearwardly, when in position in the cart, to facilitate inserting a food pan with a lid between the opposite pan guides 140 and beneath the spring clips 143. Thus, the spring clips 143 of racks R and R′ face in opposite directions.

As will be evident from FIG. 14, a slot 145 will be formed between the upper edge of a pan guide and the next pan guide above. Thus, heated air which is blown upwardly behind rack R will pass through openings 145 and above and beneath each tray of food to maintain it at a constant hot temperature, the front flanges 142 of the pan guides also tending to deflect heated air onto the pan covers. After passage between the food pans, the air will pass through slots 145 in rack R′ and down behind the rack and thus return to the heater unit H′. In this manner, each of the pans may be maintained at a constant uniform temperature and this temperature may be substantially the temperature of the food as it is removed from the stove in the kitchen. Thus, in the kitchen the food may be placed in the pans, the pans then slid onto guides 140 and door 120 closed. The cart is then wheeled to assembly station A, where it is plugged in, so that the heater and blower will maintain the food at the desired temperature until it is ready to be used. At this time, the door is opened and the trays are taken out, as needed, and placed in the wells in the food assembly station, to be dished as the plates move along the conveyor belt, as described above. In this way, a very tasty plate of food can be served and the quality thereof will be substantially the same as that obtained in the home where food is dished directly off the stove and onto the plates, to be eaten immediately.

In the event that food should be accidentally spilled from any of the pans, particularly during placement of the pans in the cart, as indicated previously, flanges 142 will cause the food to drop down at the inside of the racks, as to the next pan below or onto false bottom 130, it being noted that the flanges 142 are located inwardly of the side flanges 131 of the false bottom. Spilled food which does not remain on a pan cover will normally run to the front or rear edge of the pan cover and will drop downwardly adjacent rear wall 119 or door 120. An angle 146 having a downwardly extending lower leg will deflect such food falling adjacent the rear wall onto the false bottom, while a similar angle 147 will deflect food falling adjacent the door 120. Angle 146 is conveniently mounted on inner rear wall 119, as by spot welding or rivets, while angle 147 is similarly mounted on the inside of door 120. Angle 146 further acts to center the false bottom, being disposed between the flanges 131 thereof, as in FIG. 14. False bottom 130 is also conveniently constructed to collect any food spilled therein, since it is more readily cleaned than the parts beneath, including the heating unit. The inverted angular configuration 133′ at the front, the side flanges 131 and a rear flange 148, disposed beneath angle 146 as in FIG. 15, cause spilled food to be retained on the false bottom until it can be cleaned. For sanitary purposes, the parts of the false bottom and as many parts of the heating unit as possible are preferably formed of stainless steel.

Details of the construction of the banquet service cart B are shown in FIGS. 17–19. This cart has a pair of side walls 150 with panels 151 spaced therefrom for receiving insulation 152, as in FIG. 17, and joined by end walls 153 of FIG. 18 which extend upwardly about one-half the distance to the top of the cart and terminate in outturned flanges 154. A bottom 155 has an opening in the center thereof for receiving the heater unit H″, to be described, and is attached to the side and end walls, as by welding. As before, this cart is preferably made of stainless steel for sanitation and easy cleaning. A pair of collapsible doors, each of which will cover or uncover half of the top and one end, as in FIG. 18, are pivotally attached to flanges 154 by hinges 156. Each door includes a lower panel 157 pivoted at hinge 156 and an upper panel 158 pivotally connected to the upper edge of panel 157 by a piano type hinge 159 and having a depending flange 160 at the upper or inner end. A pair of guide pins 161 extends outwardly at either end of flange 160, as in FIG. 17, and slide in tracks 162, which are formed as slots in side panels 151 and which extend upwardly from the top of end walls 153 in spaced relation to the side edges of the top edges of end panels 151, then inwardly to the center thereof, terminating in a downturned end 163. Adjacent end 163 is a cam surface 164 over which pins 161 ride before dropping into ends 163, to prevent the doors from accidentally coming open due to jarring. Also, each door is provided with a handle 165 for opening and closing. Cart B finds its greatest utility in storing covered plates after they have been dished and for wheeling the plates into the banquet room to be served. Thus, if desired, both doors of the cart may be opened at the same time, so that two or more waiters may easily remove the covered plates from the cart at the same time, thereby increasing the speed with which the patrons may be served.

Heating unit H″ is received in a hole in bottom 155 and has certain parts similar to the parts of heating units H and H′. These include a bottom 88″, side walls 93″ having lateral flanges 94″, a rear wall 91″ having a lateral flange 92″, a motor 95″, a blower 96″, a duct 97″, an electrical heater 98″, a thermostat control 108″, a thermostat 107″ and a cord for plugging the heating unit into an electrical outlet. The bottom 88″ may extend forwardly to a front wall 167 having a flange 168, while heater 98″ may be attached to the underside of a top plate 169 having depending side flanges 170 and attached to a central wall 171 to which duct 97″ extends. A false bottom 173 fits over the heater unit and has depending side flanges 174, as in FIG. 18, and depending front and rear end flanges 175, respectively, as in FIG. 17, each of which is provided with a slot 176, through which air may move respectively from and to the heating unit. The false bottom is centered between and spaced from side panels 151 by ears 105′, as in FIG. 17, which are substantially identical to ears 105 of FIG. 13. The cart is also provided with rubber tired casters 111 at each of the four lower corners and a resilient bumper 112.

Banquet service cart B is provided with a pair of dividers shown in FIGS. 18 and 19, each of which comprises a plate 178 the longitudinal edges of which are curled around rods 179 which extend outwardly past the ends thereof, as shown. If desired, these rods need not run the full length of the divider but may merely comprise four short rods extending from the ends of the divider. These dividers are for the purpose of preventing the stacks of covered plates from becoming wobbly and possibly tipping over. Thus, when the covered plates are stacked about half way up in the cart, the dividers are placed over the stacks as shown in dotted lines in FIG. 18, to add stability thereto and to support additional covered plate stacks, placed on top of the dividers.

When the dividers are not in use, they may be stored at the sides of the cart, as shown in solid lines in FIG. 18.

For this purpose, angles 180 are attached along each side of side panels 151, as by screws or spot welds, and spaced inwardly from end walls 153 a sufficient distance to permit the dividers to slide therebehind, for storage. A supporting arm 181 extends outwardly from the upper end of each angle, as in FIG. 18, so that the divider may hang therefrom by rods 179. A bumper 182 may be provided at both ends of the lower portion of walls 153 to prevent the dividers from rattling, when in the storage position of FIG. 18.

From the foregoing, it will be apparent that a food service assembly station or service cart constructed in accordance with this invention fulfills to a marked degree the requirements and objects hereinbefore set forth. The assembly station provides means for banquet timing, so that the plates may be quickly and efficiently dished. The assembly area may be of minimum size and is conveniently located remote from the kitchen but near the banquet area. The assembly station has food wells on either side of an endless belt and the hot plates are removed from a plate cart and placed on the belt, the food being dished by personnel located at each of the wells. Each well is thermostatically controlled and may be either wet or dry. As the plates reach the end of the belt, the person at the end places a hot cover over the plate and stacks the covered plates in a banquet service cart to be wheeled to the dining room. Either the person placing the plates on the belt or the person removing the plates from the belt may be the key person who controls the amount of food and the appetizing manner in which it is placed on the plate. A limit switch is provided at the end of the belt, to prevent the plates from being pushed off and falling on the floor. Furthermore, tension of the belt may be adjusted by a pair of spaced screw members which are interconnected by a chain, so that once the initial adjustment has been made, the tension on both sides of the belt will be adjusted simultaneously.

Each of the food service carts may have a thermostatically controlled heating unit, which is mounted in the bottom thereof and has a motor connected to a blower which blows air past an electrical heater and through a passage provided by a false bottom placed over the heater unit, so that the air is circulated through the cart and is returned through another passage at the opposite side or end of the false bottom. The banquet service cart is conveniently used to store covered plates after they have been dished and to keep them warm. This cart is advantageously provided with a pair of dividers which steady the stacks of covered plates, to prevent them from falling over during sudden starting or stopping of the cart. All of the carts are readily cleaned and maintained in a sanitary condition, since all of the interior parts are removable without removing any screws, bolts or the like. As will be evident, numerous features of both the hot food cart F and the banquet service cart B may be utilized in cold food carts or other types of carts.

Although a preferred embodiment of this invention has been illustrated and described, it will be understood that other embodiments may exist and various changes and variations may be made without departing from the spirit and scope of this invention.

What is claimed is:

1. A food service cart comprising:
   a rectangular, wheel supported body having a bottom, sides and top, said sides including a pair of side walls and a pair of end walls extending upwardly to positions spaced below the upper edges of said side walls;
   a pair of folding doors adapted to form the remainder of the end walls and the top of said body, each door including a lower panel pivotally attached to the upper edge of an end wall of said body, and an upper panel hinged to the opposite edge of said lower panel, said doors being movable between an open position wherein said panels are generally in side by side relationship adjacent the corresponding end wall, and a closed position wherein said lower panel extends upwardly from said end wall and said upper panel extends inwardly to abut the upper panel of the opposite door and thereby form a top for said body; and
   means for guiding each said upper panel during movement between said positions to cause said upper and lower panels at each end to move to a side by side relationship adjacent the corresponding end wall in said open position.

2. A cart as set forth in claim 1, including:
   a track extending upwardly adjacent the outer edge of said side walls and then inwardly to the center of said body; and
   guide pins extending outwardly from each side of each said upper panel for movement within said tracks.

3. A cart as set forth in claim 1, said body being adapted to contain stacked plates and including dividers adapted to be placed across stacked plates in said body.

4. A food service cart comprising:
   a rectangular, wheel supported body having a bottom, sides and top, said sides including a pair of side walls and a pair of end walls extending upwardly to positions spaced below the upper edges of said side walls, said body being adapted to contain stacked plates;
   a pair of folding doors adapted to form the remainder of the end walls and the top of said body, each door including a lower panel pivotally attached to the upper edge of an end wall of said body, and an upper panel hinged to the opposite edge of said lower panel, said doors being movable between an open position wherein said panels are generally in side by side relationship adjacent the corresponding end wall, and a closed position wherein said lower panel extends upwardly from said end wall and said upper panel extends inwardly to abut the upper panel of the opposite door and thereby form a top for said body;
   dividers adapted to be placed across stacked plates in said body;
   a pair of angles attached to opposite inner walls and spaced inwardly from the outer edges thereof for receiving said dividers therebehind for storage; and
   an arm extending outwardly from each said angle for supporting said divider in storage position.

5. A cart as set forth in claim 4, wherein said dividers each include a panel having rods extending along each longitudinal edge thereof, said rods extending beyond the ends of said panel and thereby being adapted to be supported by said arms.

6. A food service cart comprising:
   a rectangular, wheel supported body having a bottom, sides and top, said sides including a pair of side walls and a pair of end walls extending upwardly to positions spaced below the upper edges of said side walls;
   a pair of folding doors adapted to form the remainder of the end walls and the top of said body, each door including a lower panel pivotally attached to the upper edge of an end wall of said body, and an upper panel hinged to the opposite edge of said lower panel, said doors being movable between an open position wherein said panels are generally in side by side relationship adjacent the corresponding end wall, and a closed position wherein said lower panel extends upwardly from said end wall and said upper panel extends inwardly to abut the upper panel of the opposite door and thereby form a top for said body;
   a heater unit mounted in said body;
   a false bottom mounted over said heater unit; and
   openings provided by said false bottom to permit circulation of air through said body and to and from said heater unit; and
   air circulation means for moving air to and from said heater through said openings.

(References on following page)

References Cited

UNITED STATES PATENTS

| | | | |
|---|---|---|---|
| 464,058 | 12/1891 | Baldwin | 126—268 X |
| 1,634,699 | 7/1927 | Upjohn | 312—10 X |
| 2,790,888 | 4/1957 | Hoffmann | 219—369 X |
| 2,835,546 | 5/1958 | Rothschild | 312—324 X |
| 2,845,780 | 8/1958 | Conklin et al. | 312—350 X |
| 2,903,318 | 9/1959 | Brockway | 312—304 |
| 3,042,384 | 7/1962 | Bauman | 312—236 X |
| 3,124,402 | 3/1964 | Rhoads | 312—351 X |

FOREIGN PATENTS 125,693    9/1947    Australia.

RICHARD M. WOOD, *Primary Examiner.*

C. L. ALBRITTON, *Assistant Examiner.*